UNITED STATES PATENT OFFICE.

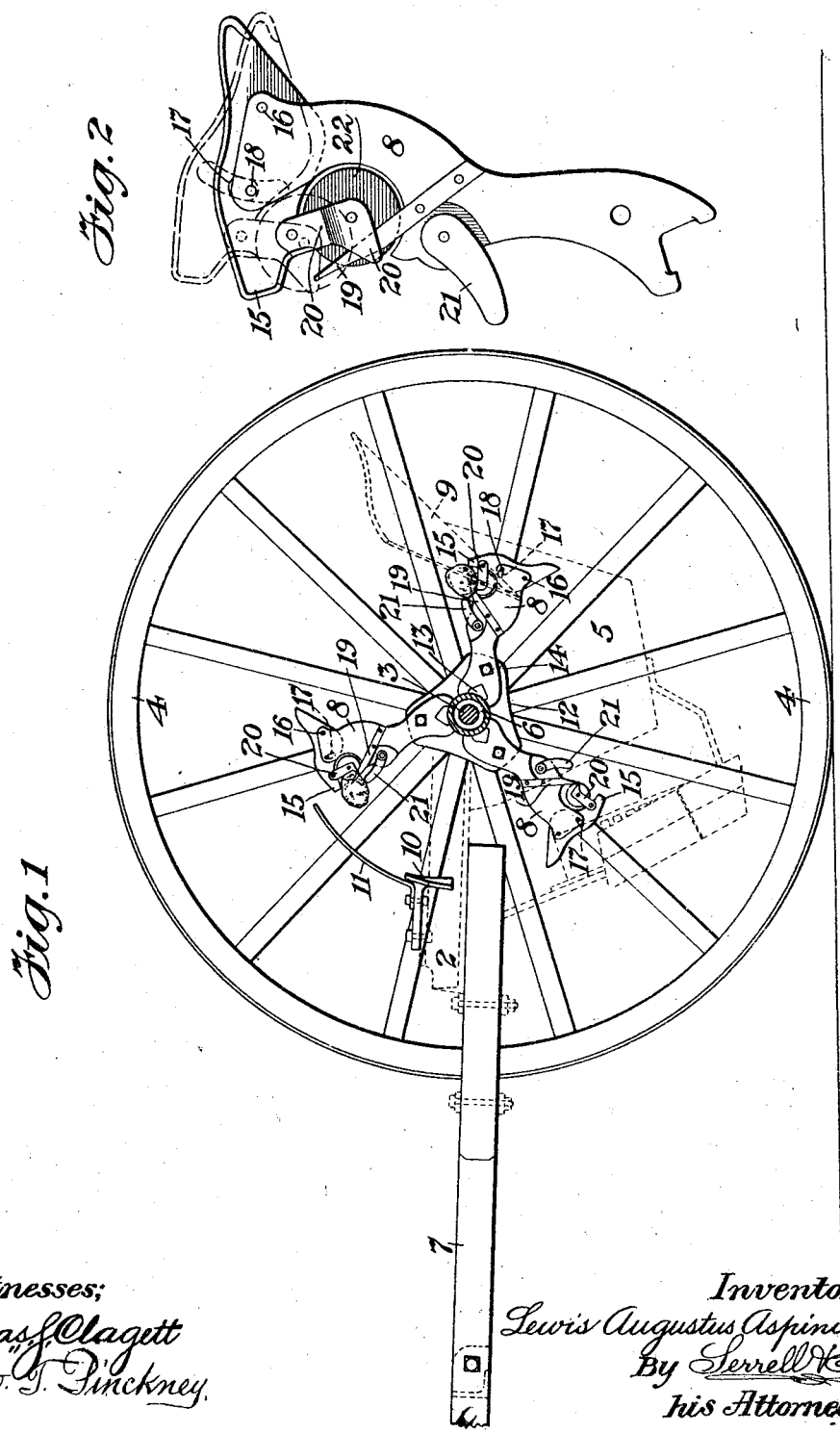

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

POTATO-PLANTER.

1,052,203.

Specification of Letters Patent. Patented Feb. 4, 1913.

Application filed July 27, 1912. Serial No. 711,782.

*To all whom it may concern:*

Be it known that I, LEWIS AUGUSTUS ASPINWALL, a citizen of the United States, residing at Jackson, in the county of Jackson, State of Michigan, have invented a certain new and useful Improvement in Potato-Planters, of which the following is a specification.

My present invention relates to improvements upon the potato planting devices shown and described in Letters Patent heretofore granted to me, and particularly Patents No. 709,666, dated September 23, 1902, and No. 864,595, dated August 27, 1907; and the same is a division of the subject-matter of my pending application for Letters Patent for an improvement in potato-planter filed February 17, 1911, Serial No. 609,301.

My present invention relates particularly to the picker devices of said patents and said application, and the object of the same is to readily seed large size potatoes in delivering the potatoes and less apt to be held on to the seed potatoes.

In carrying out my invention, I attach the hinge piece of the picker arm so as to insure the latency of the potato at the time and place required, and I have added to this movable hinge piece a contribute stripping plate which straddles the prongs of the picker device and also a disc roller secured to the rounding plate of the hinge piece and located between the prongs and which with the movement of the hinge piece insures the delivery of the potato at the right place and moment.

In the drawing, Figure 1 is, on the sheet, at the left-hand side of my improved potato planter with the left wheel removed, and showing only so much of the mechanism associated with its picker devices as is necessary for the understanding of my invention, and Fig. 2 is an enlarged elevation of my improved picker device.

Similar letters of reference in all the figures indicate similar parts of the device.

I have illustrated in Fig. 1 certain parts which are necessary for the full understanding of the device of my invention, and which are associated in my improved potato planters. These form no necessary part of the present invention but are similar to what I have heretofore shown in my aforesaid patents and said application. These parts relate to the frame 1 of the machine, to the main axle 2; to the wheels, one of which (4) is shown; to the magazine 5 for the potatoes; and to the delivery devices and concaves 6, which are shown in dotted lines, so as to indicate their relation to the picker devices in the movement of the latter. They also relate to the sleeve 6 around the axle and to the divided part 7. The parts associated together and which coöperate with and form the device of the present invention, comprise the picker arms 8 of suitable metal, secured by bolts to a head 12 and the lower ends of said arms are recessed to cover the bosses 13 associated with the head 12 and curved to fit the sleeve 6 around the axle. The arms are secured in position by the bolts 14, hence, when the bosses receive the recessed ends of the arms and the bolts 14 are secured then can be no possible looseness of said parts in their motion.

I have shown a tripper 16 on a guard 11 forward of the main axle 5 in a position to move the hinge piece 15 of the picker arm 8 when the same comes in contact with the tripper 16. This hinge piece 15 is connected by a pivot pin 20 to the picker arm, and said hinge piece is provided with a stop 17 and the arm with a pin 18, whereby the movement of the hinge piece in either direction is limited, controlled and provided for. The arm 8 is provided with two small prongs 19 of a rising inclination to the radial line of the arm and adapted to impale thereon a potato at a time. I have shown and made a stripping plate 21 which comes out over the sides of the prongs 19 and are secured to and move with the hinge piece 15, and between and pivoted to the stripping plate a disk roller 22, which has a recess in the sleeve arm 8 provided therefor consequently the prongs 19 and roller 22 move or swing with the hinge piece 15, as shown by dotted lines in Fig. 2. The function of the disk roller 22 is to support large seed potatoes and it is controlled by gravity as the picker enters the concaves below. The seed potato is held by the prongs and rests upon the disk roller 22, having the forward or advancing portion of the hinge piece 15 to further support the same and the recessed hinge piece 21 adjacent to the prongs affords additional support when the seed potato is large, thus preventing any breaking from the prongs 19. By comparison of the hinge piece 15 with the similar device shown in my aforesaid patents, and particularly Patent No. 864,595, it will be apparent that the advancing end thereof has been very appreciably shortened, for experiment has demonstrated that the long pointed head was liable to hold the seed potatoes on the prongs and prevent the delivery of the same freely, quickly and accurately when the head was tripped. A further experiment has shown, conclusively, that the shortening of the head and the addition thereto of the stripping devices or plates 20 effectually remove the potatoes from the prongs when the picker head is tripped and at exactly the right moment and the right place, so that the direction and timing of the discharge of the seed potatoes is accurate and positive.

This improvement is decidedly advantageous in both my single and double row potato planting machines, and no difference in the operation appears with this improvement, so far as relates to taking up the potatoes from the concaves.

I claim as my invention:

1. In a potato planter, a picker device including stripping plates, an intermediate disk roller and prongs and a movable hinge piece with a blunt advancing end coming approximately in line with the prongs.

2. The combination in a potato planter with the picker device, including a movable hinge piece and prongs of stripping plates connected to the movable hinge piece, and coming at opposite sides of the prongs and a disk roller between the prongs pivoted to the stripping plates and adapted with the movement of the head to insure the stripping of the potatoes from the prongs and the delivery thereof.

3. The combination in a potato planter with each picker arm, of a blunt ended hinge piece a pivot therefor at the end of the arm, means for controlling the swinging movement of said hinge piece, prongs secured to said arm and occupying an upwardly and forwardly inclined position, stripping plates and a disk roller secured to and movable with the picker head, the stripping plates coming at opposite sides of the prongs and the disk roller between the prongs.

4. The combination in a potato planter with each picker arm, of a blunt ended hinge piece, a pivot therefor at the end of the arm, means for controlling the swinging movement of said hinge piece, prongs secured to said arm and occupying an upwardly and forwardly inclined position, stripping plates and a disk roller secured to and movable with the picker head, the stripping plates coming at opposite sides of the prongs, and the disk roller between the prongs, and a thumb piece pivoted to each picker arm and adapted to support the larger potatoes as impaled upon the prongs.

Signed by me this 17th day of July 1912.

LEWIS AUGUSTUS ASPINWALL.

Witnesses:
C. G. Rowley,
Geo. N. Whitney.